US009077671B2

(12) United States Patent
Yanovsky et al.

(10) Patent No.: US 9,077,671 B2
(45) Date of Patent: *Jul. 7, 2015

(54) REAL-TIME NETWORK UPDATES FOR MALICIOUS CONTENT

(71) Applicant: SonicWALL, Inc., San Jose, CA (US)

(72) Inventors: Boris Yanovsky, Saratoga, CA (US); Scott D. Eikenberry, Menlo Park, CA (US); Bhuvan Racham, Sunnyvale, CA (US); Nick Bilogorskiy, Sunnyvale, CA (US); Gayatri Bhimaraju, Cupertino, CA (US)

(73) Assignee: Dell Software Inc., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,210

(22) Filed: Aug. 14, 2013

(65) Prior Publication Data

US 2013/0332552 A1     Dec. 12, 2013

Related U.S. Application Data

(63) Continuation of application No. 12/661,470, filed on Mar. 16, 2010, now Pat. No. 8,522,347.

(60) Provisional application No. 61/160,613, filed on Mar. 16, 2009.

(51) Int. Cl.
*G06F 21/00* (2013.01)
*H04L 12/58* (2006.01)
*H04L 29/06* (2006.01)

(52) U.S. Cl.
CPC ............ *H04L 51/04* (2013.01); *H04L 63/1408* (2013.01)

(58) Field of Classification Search
CPC ............ H04L 63/1408; H04L 63/1425; H04L 63/123; H04L 63/1441; H04L 63/1458; G06F 21/552
USPC ............................ 709/206; 726/3, 12, 22, 25
See application file for complete search history.

(56) References Cited

U.S. PATENT DOCUMENTS

| | | | |
|---|---|---|---|
| 7,519,998 B2 | 4/2009 | Cai et al. | |
| 7,610,344 B2 | 10/2009 | Mehr et al. | |
| 7,702,107 B1* | 4/2010 | Messing | 380/259 |
| 7,712,132 B1 | 5/2010 | Ogilvie | |
| 7,761,566 B2* | 7/2010 | Adelman et al. | 709/224 |
| 7,779,156 B2 | 8/2010 | Alperovitch et al. | |
| 7,783,883 B2* | 8/2010 | Gasparini et al. | 713/168 |
| 7,836,133 B2 | 11/2010 | Quinlan et al. | |
| 7,854,007 B2 | 12/2010 | Sprosts et al. | |
| 7,958,555 B1 | 6/2011 | Chen et al. | |
| 8,069,213 B2 | 11/2011 | Bloch et al. | |
| 8,434,150 B2* | 4/2013 | Xie et al. | 726/22 |
| 8,522,347 B2* | 8/2013 | Yanovsky et al. | 726/23 |
| 2003/0023876 A1 | 1/2003 | Bardsley et al. | |
| 2003/0195861 A1 | 10/2003 | McClure et al. | |
| 2003/0212779 A1 | 11/2003 | Boyter et al. | |
| 2005/0044418 A1 | 2/2005 | Miliefsky | |
| 2007/0078775 A1 | 4/2007 | Huapaya et al. | |
| 2007/0078936 A1* | 4/2007 | Quinlan et al. | 709/206 |

(Continued)

*Primary Examiner* — Mohammad A Siddiqi
(74) *Attorney, Agent, or Firm* — Lewis Roca Rothgerber LLP

(57) ABSTRACT

A global response network collects, analyzes, and distributes "cross-vector" threat-related information between security systems to allow for an intelligent, collaborative, and comprehensive real-time response.

20 Claims, 4 Drawing Sheets

(56) References Cited

U.S. PATENT DOCUMENTS

| | | |
|---|---|---|
| 2007/0107059 A1 | 5/2007 | Chasin et al. |
| 2007/0180526 A1 | 8/2007 | Copeland |
| 2007/0277238 A1 | 11/2007 | Margalit et al. |
| 2009/0064323 A1* | 3/2009 | Lin ................................ 726/22 |
| 2009/0254529 A1 | 10/2009 | Goldentouch |
| 2010/0174795 A1* | 7/2010 | Adelman et al. .............. 709/206 |
| 2011/0016527 A1 | 1/2011 | Yanovsky |
| 2011/0022670 A1* | 1/2011 | Drako et al. .................. 709/206 |

* cited by examiner

REAL-TIME NETWORK UPDATES FOR MALICIOUS CONTENT

CROSS-REFERENCE TO RELATED APPLICATIONS

The present application is a continuation and claims the priority benefit of U.S. patent application Ser. No. 12/661,470 filed Mar. 16, 2010, now U.S. Pat. No. 8,522,347, which claims the priority benefit of U.S. provisional application No. 61/160,613 filed Mar. 16, 2009, the disclosure of each of the aforementioned applications is incorporated herein by reference The present application is related to U.S. patent application Ser. No. 11/156,372 filed Jun. 16, 2005 and U.S. patent application Ser. No. 11/156,373 filed Jun. 16, 2005, now U.S. Pat. No. 7,343,624, the disclosure of each of the aforementioned applications is likewise incorporated herein by reference

BACKGROUND OF THE INVENTION

1. Field of the Invention

The present invention generally relates to network security. The present invention more specifically relates to the intelligent and real-time response to malicious content threats in a global network.

2. Description of the Related Art

Initial efforts in defending against the annoyance and threat of unwanted electronic mail (i.e., spam) came in the form of designating mail as 'junk.' An e-mail recipient could designate unwanted e-mail in their inbox as junk. Once designated as junk, the e-mail was removed from the recipient inbox and sent to a 'junk' folder. The sender of the designated e-mail was then added to a 'blocked' or 'black' list whereby subsequent messages from that sender were likewise diverted to the 'junk' folder. Erroneously designated messages could be 'un-junked' and the process would be undone.

Over time, however, senders of e-mail learned to use random or spoofed sender addresses. By constantly changing sender identities, a particular sender of spam could make a prior 'junk' designation as to a particular address ineffective. In response to this development, the analysis of electronic-mail designated as 'junk' (or later 'un-junked') went beyond mere sender identification. Electronic mail messages were disassembled into more fundamental components such as the identity of the sender, specific aspects as to the content of the message, present of hyperlinks, and other distinguishing characteristics.

More and more users send and receive electronic mail—including spam. The increased number of users is indicative of a populace that has become increasingly reliant on network communications and resources. This increased reliance corresponds to a shift in the presence of sensitive information on network infrastructures. As the amount and importance of sensitive information on networks has grown, so has the incentive and opportunity for poorly intentioned users to introduce spam and other malicious threats into a network—often at a global level. The growth in users, sensitive information, and potential threats coupled with the need to isolate threats at time-zero before they can infect or affect a network or networks requires a system with increased speed and scalability and that can operate on a global scale.

SUMMARY OF THE PRESENTLY CLAIMED INVENTION

A first claimed embodiment is for a system for delivery of a message over a network.

A second claimed embodiment is for a system for receiving and providing real-time network updates for malicious content.

A third claimed embodiment is for a method for establishing the reputation of message components.

A fourth claimed embodiment is for a method for characterizing messages using real-time updates received from a network data center.

DETAILED DESCRIPTION

Embodiments of the present invention allow for a global response network to collect, analyze, and distribute "cross-vector" threat-related information between security systems to allow for an intelligent, collaborative, and comprehensive real-time response.

Figure 1:
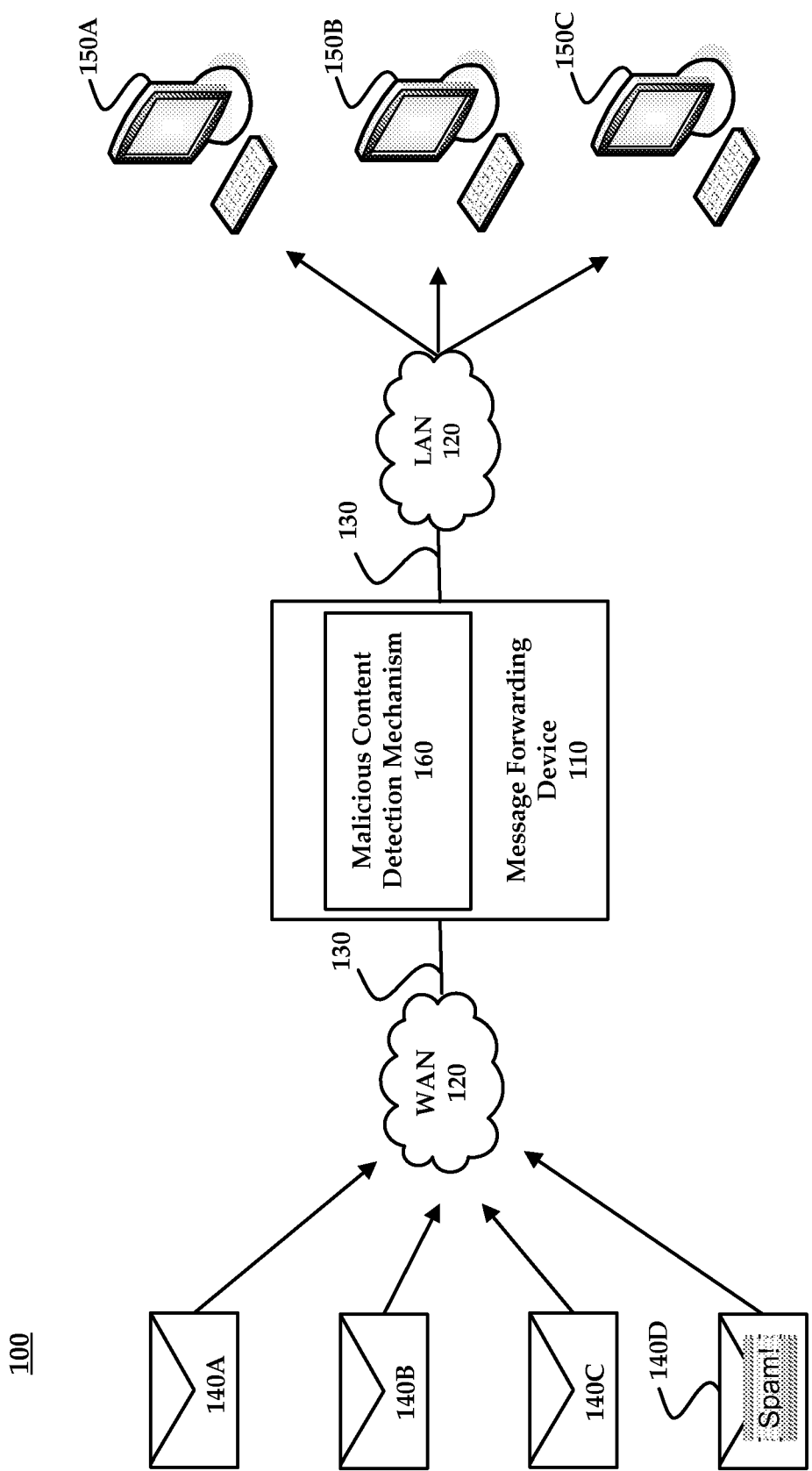
FIG. 1 illustrates a system for delivery of a message over a network.

FIG. 1 illustrates a system 100 for delivery of a message over a network. In FIG. 1, a message forwarding device 110 may be implemented in the context of a mail server or other gateway device. The message forwarding device 110 exchanges messages over one or more communications networks 120 using one or more network interfaces 130. Network 120 may be a wide area network (WAN) such as the global Internet or a local area network (LAN), which may be secured. Message forwarding device 110 may be further implemented in the context of or behind a firewall (not shown).

Message forwarding device 110 executes program(s) stored in memory by means of a processor to effectuate the forwarding of messages (140A ... D) received over networks 120 at network interface 130. A message might be forwarded to a user client device (150A ... C), a mail server or gateway, or some other network device depending upon the particular configuration of the message forward device 110 relative one or more networks 120. Messages 140 received at message forwarding device 110 may include malicious content (e.g., 140D) such as a virus, worm, or some other item that can cause unwanted behavior on a user device 150 or in networks 120.

To avoid the 'spread' of a message including malicious content, message forwarding device 110 may include a malicious content detection mechanism 160. Malicious content detection mechanism 160 may implement any of the various detection techniques and methodologies disclosed in co-pending U.S. patent application Ser. No. 11/156,372 filed Jun. 16, 2005 and entitled "Time Zero Detection of Infectious Messages" and U.S. patent application Ser. No. 11/156,373 filed Jun. 16, 2005 and entitled "Managing Infectious Messages as Identified by an Attachment." These techniques include, but are not limited to, signature matching tests, file names tests, character tests, but pattern tests, N-gram tests, bit pattern tests, and probabilistic finite state automata tests. Information related to or required to properly execute these tests may be acquired from the network data center 210 of system 200 and addressed in the context of FIG. 2 below.

Detection mechanism 160 may be implemented as software stored in memory of device 110 and executable by a processor. Mechanism 160 may alternatively be implemented as firmware or a specialized hardware component communicatively coupled to device 110. In some instances, mechanism 160 may be implemented in a separate network component that communicates with device 110 over network 120. Malicious content detection mechanism 160 could, therefore, be implemented at a user client device 150.

Networks are particularly vulnerable during the time window between the first appearance of malicious content (e.g., a virus) and the deployment of information related to indentifying and subsequently quarantining or destroying the virus. This time window is sometimes referred to a "time zero" or "day zero." This period of vulnerability applies to not only the initial appearance of a virus or some other form of malicious content, but re-emergence of a subsequent iteration of the virus that may have mutated rendering previous information concerning identification, quarantine, and destruction obsolete or ineffective.

In order to offer optimal network protection, malicious content detection mechanism 160 should remain up to date with respect to information indicative of the most recent iterations of malicious content. If malicious content detection mechanism 160 has the most up to date information concerning malicious content, then message forwarding device 110 can prevent the introduction of malicious content received over the Internet into a more secure environment such as a corporate intranet. Having access to the most up to date information, too, may prevent a user from contributing to the spread of the malicious content within the secure network or to the network of another entity by preventing the transmission of 'infected' messages.

Malicious content detection mechanism 160 may similarly operate as a line of first defense in identifying the emergence of new malicious content threats. For example, a message with an executable file may be received at a message forwarding device 110 in a secure network. A user may inadvertently execute the file and cause some unwanted result on their personal computing device 150 if not the greater private network. Regardless of the scope of damage, the existence of this new threat may be identified and logged by the malicious content detection mechanism 160 and reported to a network data center 210 like that illustrated in the system 200 of FIG. 2.

Figure 2:
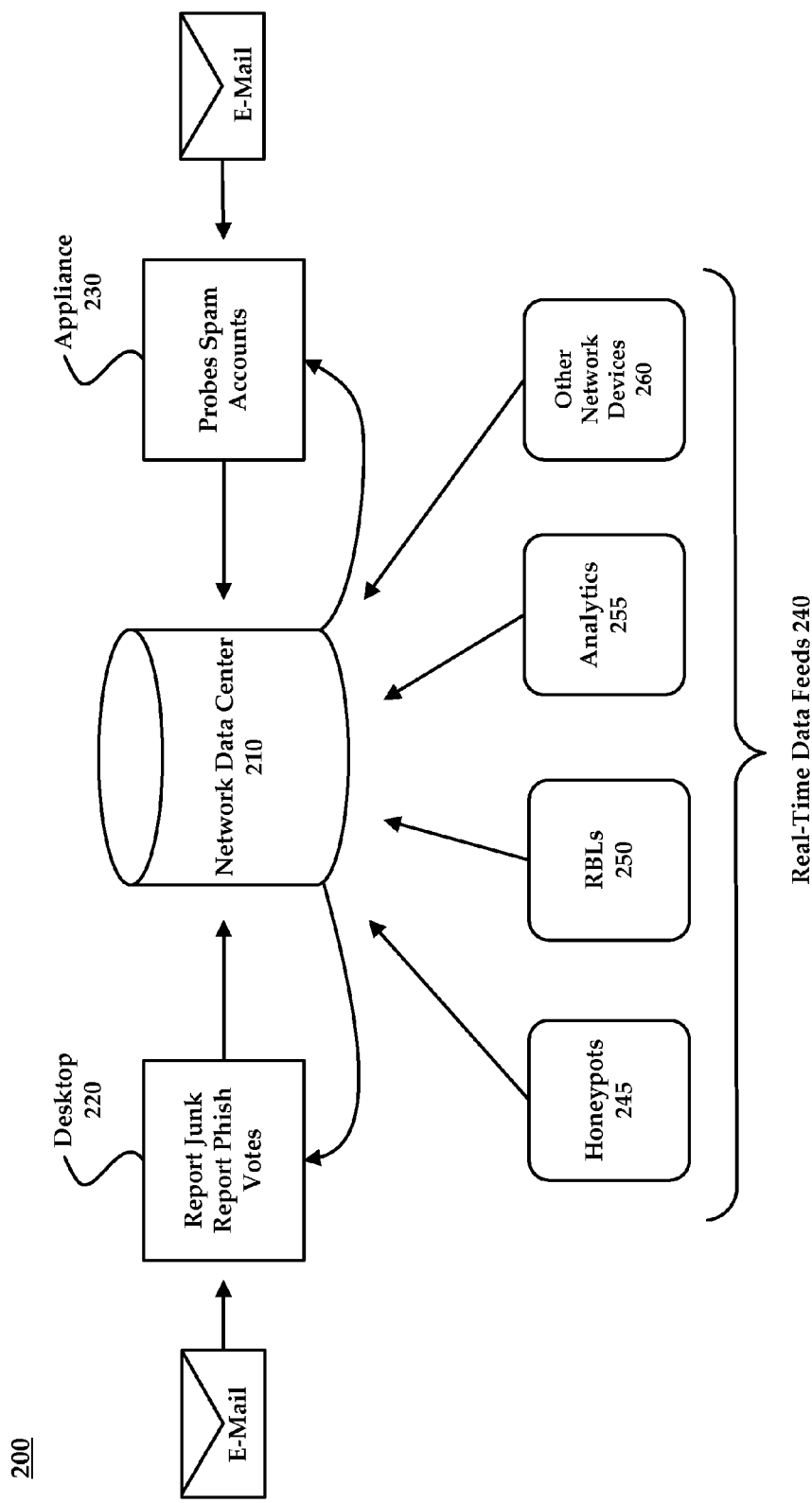
FIG. 2 illustrates a system for receiving and providing real-time network updates for malicious content.

FIG. 2 illustrates a system 200 for receiving and providing real-time network updates for malicious content. System 200 as illustrated in FIG. 2 includes a network data center 210, a desktop application 220, enterprise e-mail appliance 230, and various real-time data feeds 240. While a single desktop application 220 and enterprise appliance 230 are illustrated in the context of FIG. 2, any number of applications or appliances may be a part of system 200 and contribute data utilized by data center 210 to provide real-time network updates.

Network data center 210 utilizes collaborative filtering to create reputation scores for vector components. By using collaborative filtering, network data center 210 aggregates data from numerous sources in order to identify threats and to collaboratively define suspected vector components that should be blocked or filtered. For example, and as illustrated in FIG. 2, network data center 210 receives data and information from the desktop application 220 and the enterprise appliance 230, which are each running an implementation of malicious content detection mechanism 160 as described in the context of FIG. 1.

Network data center 210 may acquire this information through regularly scheduled queries or polling. Network data center 210 may also acquire this information as a part of a real-time probe made to gather immediate and the most up to date information concerning new malicious content threats. Network data center 210 may also acquire this information from data feeds 240 in real-time or as a part of regularly scheduled query operation. Desktop application 220 and enterprise appliance 230 may also provide information to network data center 210 as a part of a push operation. Batches of data concerning malicious content gathered by the malicious content detection mechanism 160 at these applications and devices may be delivered to the network data center 210 on a regularly scheduled push operation.

The real-time data feeds 240 may include honey pots (245). Honey pots are domains that receive a significant amount of unsolicited messages and malicious content. These domains may be harvested whereby all the malicious content is harvested, thumb printed, and reported in order to maintain a more robust catalog of malicious content that may be reported to local clients or mail appliances.

Real-time data feeds 240 may also includes information from real-time blacklist providers (RBLs) (250). A DNS-based black hole list provided by an RBL is a list of IP addresses published throughout the Internet Domain Names Service in a particular format. DNSBLs are used to publish the address of computers or networks related to spamming. Most mail servers can be configured to reject or flag messages sent from a site listed in a DNSBL.

Real-time data feeds 240 can also include rating analytic information (255) generated by an entity such SonicWALL, Inc. of San Jose, Calif. SonicWALL's SonicLabs program employs a team of specialized rating analysts that review sequencing results and vet data on multiple levels. This vetting adds an additional layer of checks-and-balances to characterization of content.

Industry professionals, individual spam submissions from network administrators, and other network devices (260) may likewise contribute data to network data center 210 in an effort to combat the spread of malicious content over networks. For example, a network administrator may report information about directory harvest attack (DHA) type messages.

A DHA involves messages that are sent to non-existent recipients. For example, a spammer may simply run a randomized dictionary application that creates a number of user name permutations for a given domain. Message sent to non-existent mail recipients may be identified as malicious because they are most likely a part of a DHA. DHA type messages are most likely spam. If there is a spike in messages that have been labeled as possible DHAs, then the likelihood that such a message is spam or is otherwise malicious only further increases.

Network data center 210 and malicious content detection mechanism 160 may implement cross-vector protection whereby various threats are grouped by vectors corresponding to a particular port which suspect traffic might breach a network perimeter. For example, traffic over Port 25 might related to the e-mail vector whereas traffic over Port 80 might relate to the Web vector. In such an instance, an incoming electronic mail message might include a URL that causes the message to be deemed suspicious. By utilizing a cross-vector approach, access to the message might be blocked on Port 25 (i.e., the e-mail vector) whereas access to the URL that caused the message to be deemed suspicious is simultaneously blocked on Port 80 (i.e., the Web vector).

Each component of any given vector can receive independent analysis and filtering. A single e-mail message, for example, might be broken down into several components such as a sender Internet Protocol (IP) address, content of the text of the message, structure of the message, links (i.e., URLs) in the message, file attachments, and embedded images. Any of these components might individually be a recognized as a threat, the presence of which might cause a message to subsequently have a "good" or "bad" reputation as a result of the aforementioned collaborative filtering.

Figure 3:
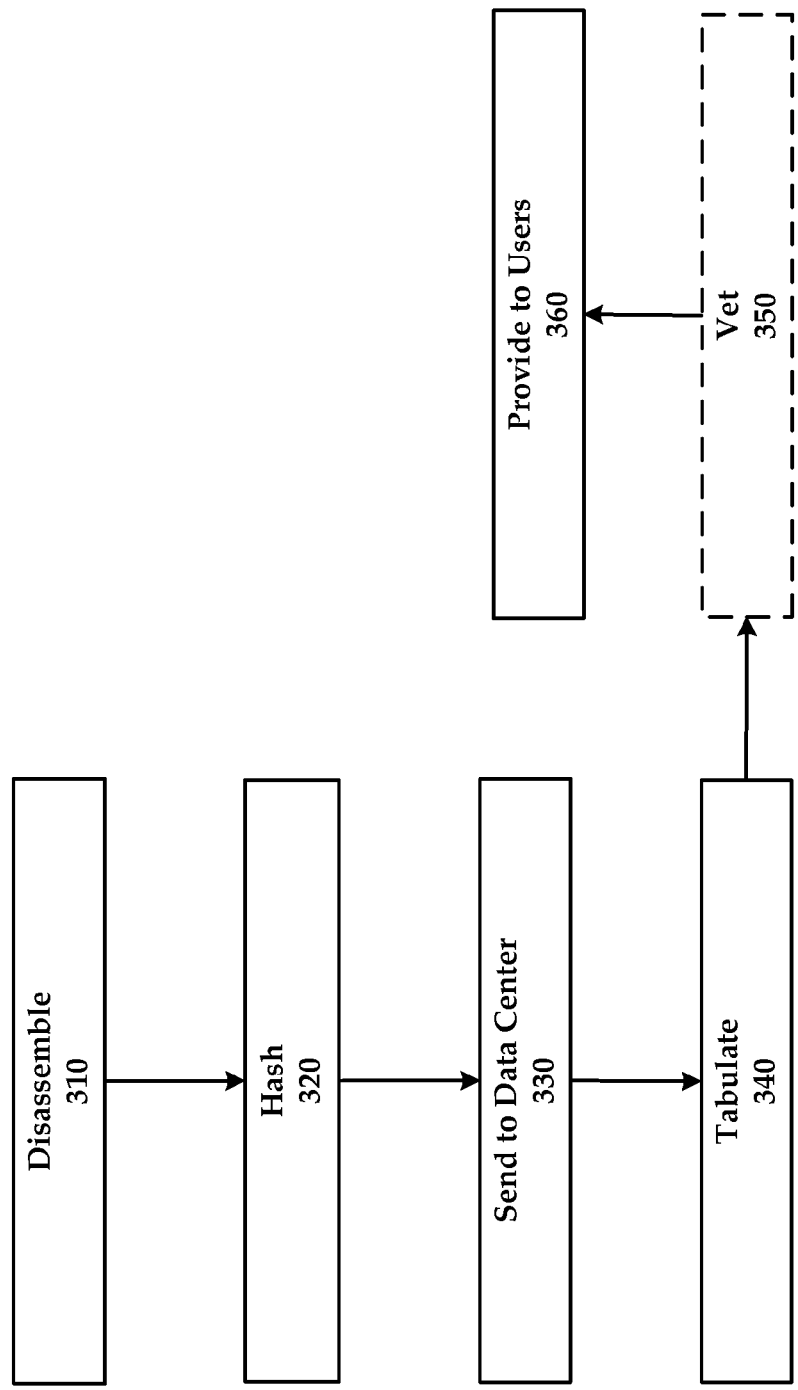
FIG. 3 illustrates a method for establishing the reputation of message components.

FIG. 3 illustrates a method 300 for establishing the reputation of message components. The reputation of components from a particular e-mail message may be determined through the compilation and weighting of junk and unjunk "votes." When an e-mail is disassembled by malicious content detection mechanism 160 at step 310, each component may be encrypted using a non-reversible hash process to create a "thumbprint" of that component (320). These thumbprints—not the original component data itself—are then sent to the data center 210 at step 330 with a corresponding reputation of 'good' or 'bad.' The data is then tabulated in real time at the network data center 210 at step 340. Transmissions of data may be encoded over HTTPS, using the DES/AES encryption of the browser.

System 200 may implement certain measures to prevent spammers or other unscrupulous third-parties from skewing a characterization of content, which may not necessarily be malicious but simply annoying (e.g., unsolicited commercial offers). In such an implementation, each malicious content detection mechanism 160 at a corresponding network device (e.g., the desktop application 220 or enterprise appliance 230) is allocated a single 'vote' per 'thumbprint' per day. For example, if the same URL is determined to be bad by an anti-spam desktop application 210 user in New York and another anti-spam desktop 210 user in Beijing, each user is anonymously allowed a single individual vote. Once data and corresponding votes are compiled at the data center 210 from applications 220 and appliances 230 in step 340, those compilations may optionally be vetted against votes from all other sources such as honey pots 245 in step 350. The compiled and vetted information may then be provided to the malicious content detection mechanisms 160 of network devices in step 360.

Figure 4:
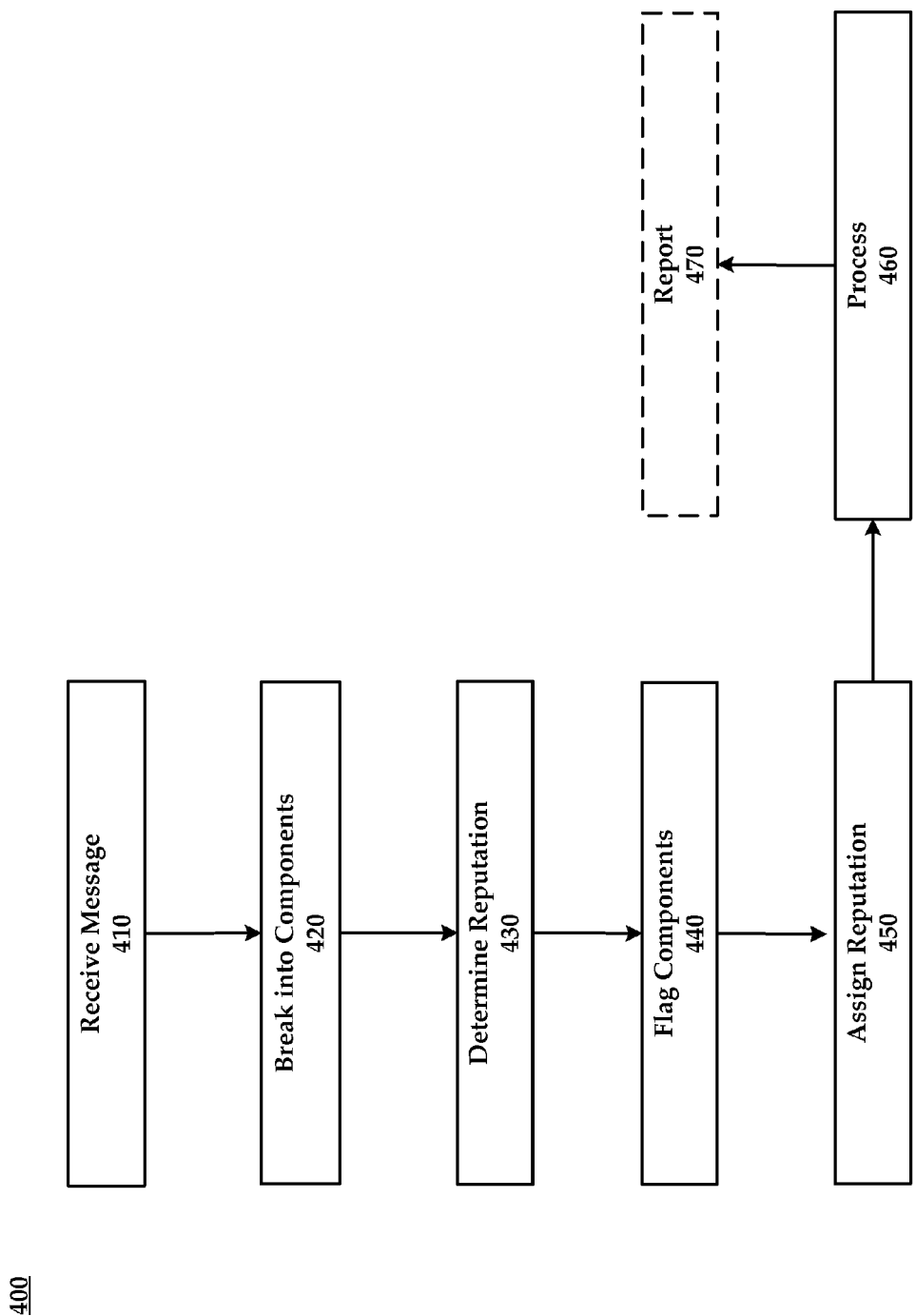
FIG. 4 illustrates a method for characterizing messages using real-time updates received from a network data center.

FIG. 4 illustrates a method 400 for characterizing messages using real-time updates received from the network data center 210. When an e-mail message is received at a mail forwarding device 110 (step 410), the message is broken down into its component parts (thumbprints) (step 420). The reputation of each component is determined using information from the data center 210 at step 430. Information from the data center 210 has been pushed to the malicious content detection mechanism 160 on a regularly scheduled basis (e.g., every five minutes as part of step 360) or received in response to a direct query by the malicious content detection mechanism 160. If one or more components are flagged as junk (step 440), then the e-mail may be identified as having a reputation of junk (step 450) and processed accordingly (step 460), which may include quarantining or deletion of the message. Information concerning processing of the message in step 460 may be reported back to the network data center 210 in optional step 470.

Collaborative filtering provides for a self-correcting human element. For example, the data center 210 may recognize that a particular IP address has transmitted a spam e-mail. The sender of the e-mail from that IP address may be known to be legitimate and have a good reputation. By vetting the evaluation from one contributor against evaluations from multiple other contributors regarding this particular IP address and sender, a broader statistical sample is established, and a more accurate reputation score can be determined. This comprehensive vetting process can be applied to all thumbprint types.

The network data center 210 of FIG. 2 operates with respect to not only spam messages, but virus-related information and malware. Information related to viruses and malware may be generated in a similar fashion as spam thumbprints. Information may also be acquired through the receipt of continual updates from anti-virus specialists such as McAfee or and Kaspersky Labs. Embodiments of the presently disclosed invention may implement deep packet inspection (DPI).

Embodiments of the presently disclosed invention may also use signatures, which differ from thumbprints as signatures are based on pattern matching. For example, a particular string of information such as a byte string or binary string (or any other string of data) might be followed by a subsequent string, which might (in turn) be followed by yet another string. This pattern of strings may be indicative of a particular type of malicious content. Use of pattern matching and signatures may be particularly useful in the context of a file being streamed through an appliance. Signatures are particular to data within a file. These signatures may be based on pattern recognition, heuristics, file analysis, or behavioral analysis.

Thumbprints are a hash or some other unique identifier of the file or portions of the file. A thumbprint differs from a signature in that a particular file might correspond to a signature for a particular type of malicious content. The signature of the file, however, might different notwithstanding the fact that an identical signature is otherwise present. For example, three particular byte strings might correspond to a particular signature. Data interspersed in that signature, however, might result in a different thumbprint. Thumbprints need not be taken with respect to the entirety of a file and may be applied against particular portions of a file. Thumbprints may be taken with respect to IP addresses, images, content in a message body, content, URLs, and contacts points such as phone numbers, email addresses and URLs.

Various embodiments of the presently disclosed invention may include memory, network interfaces, processors, internal bus, and other hardware and/or software as may be utilized by one of skill in the art. Certain methods may be implemented in software. A computer-readable storage medium such as memory, hard drive, flash drive, or some other non-transitory storage medium may be utilized to store those instructions, which are (in turn) accessible to a processor or processors for execution. In some instances, those instructions may be embodied as microcode and implemented in the context of an application specific integrated circuit.

While various embodiments have been described above, these embodiments have been presented by way of example and not limitation. The descriptions are not intended to limit the scope of the invention to any particular embodiment set forth herein. The present descriptions are intended to cover alternatives, modifications, and equivalents and may be included within the spirit and scope of the invention.\

For example, the network data center may maintain thumbprints of legitimate content. A particular message thumbprint may see a spike in traffic around the world. This may, however, be the result of a company-wide newsletter being sent from human resources to every member of every office of a company with 20 offices worldwide, each office having more than 100 employees. The existence of legitimate message spikes may be presented to clients and appliances in order to ensure that such messages are not incorrectly excluded from delivery to an end user.

What is claimed is:

1. A method for establishing the reputation of message components, the method comprising:
    receiving a first update of aggregated reputation information of one or more constituent components from a data center by a security appliance;
    receiving an electronic message by the security appliance;
    disassembling the electronic message into the one or more constituent components at a by the security appliance;
    identifying a reputation for each of the one or more constituent components by the security appliance, wherein at least one of the reputations identified is a bad reputation and corresponds to a vector that identifies one or more ports through which the electronic message might breach a network perimeter, information received over a first port includes a reference to information accessed over a second port, and the information accessed over the second port is associated with the vector that corresponds to the one or more constituent components with the at least one bad reputation;
    transmitting the data regarding the identified reputation for each of the one or more constituent components from the security appliance to the data center, wherein the data center receives data regarding the one or more constituent components from a plurality of other security appliances and tabulates a second update to the aggregated reputation information of the one or more constituent components in part by vetting the identified reputation data against the data received from the plurality of other security appliances; and
    receiving the second update to the aggregated reputation information from the data center by the security appliance.

2. The method of claim 1, wherein the reputation for each of the one or more constituent components are identified using the aggregated reputation information received from the data center.

3. The method of claim 1, wherein the reputation for each of the one or more constituent components are identified using at least one of an IP address, a URL, a file attachment, or an embedded image.

4. The method of claim 1, wherein the identified reputation data are vetted against the data received from the plurality of other security appliances using votes from the security apparatus against votes from the plurality of other security apparatus.

5. The method of claim 1, wherein updates to the aggregated reputation information are received periodically by the security appliance from the data center.

6. The method of claim 1, wherein the security appliance transmits the identified reputation information periodically to the data center.

7. The method of claim 1, wherein the data center polls the security appliance for the identified reputation information.

8. The method of claim 1, wherein the security appliance transmits the identified reputation information as a real time feed to the data center.

9. The method of claim 1, wherein the security appliance is a computing device operated by an end user.

10. The method of claim 5, wherein at least one of the plurality of periodic updates to the aggregated reputation information received includes information provided by a network administrator.

11. A non-transitory computer storage medium having embodied thereon a program executable by a processor to perform a method for establishing the reputation of message components, the method comprising:
    receiving a first update of aggregated reputation information of one or more constituent components from a data center by a security appliance;
    receiving an electronic message by the security appliance;
    disassembling the electronic message into the one or more constituent components by the security appliance;
    identifying a reputation for each of the one or more constituent components by the security appliance, wherein at least one of the reputations identified is a bad reputation and corresponds to a vector that identifies one or more ports through which the electronic message might breach a network perimeter, information received over a first port includes a reference to information accessed over a second port, and the information accessed over the second port is associated with the vector that corresponds to the one or more constituent components with the at least one bad reputation;
    transmitting the data regarding the identified reputation for each of the one or more constituent components from the security appliance to the data center, wherein the data center receives data regarding the one or more constituent components from a plurality of other security appliances, and tabulates a second update to the aggregated reputation information of the one or more constituent components in part by vetting the identified reputation data against the data received from the plurality of other security appliances; and
    receiving the second update to the aggregated reputation information from the data center by the security appliance.

12. The non-transitory computer readable storage medium of claim 11, wherein the reputation for each of the one or more constituent components are identified using the aggregated reputation information received from the data center.

13. The non-transitory computer readable storage medium of claim 11, wherein the reputation for each of the one or more constituent components are identified using at least one of an IP address, a URL, a file attachment, or an embedded image.

14. The non-transitory computer readable storage medium of claim 11, wherein the identified reputation data are vetted against the data received from the plurality of other security appliances using votes from the security apparatus against votes from the plurality of other security apparatus.

15. The non-transitory computer readable storage medium of claim 11, wherein updates to the aggregated reputation information are received periodically by the security appliance from the data center.

16. The non-transitory computer readable storage medium of claim 11, wherein the security appliance transmits the identified reputation information periodically to the data center.

17. The non-transitory computer readable storage medium of claim 11, wherein the data center polls the security appliance for the identified reputation information.

18. The non-transitory computer readable storage medium of claim 11, wherein the security appliance transmits the identified reputation information as a real time feed to the data center.

19. The non-transitory computer readable storage medium of claim 11, wherein the security appliance is a computing device operated by an end user.

20. The non-transitory computer readable storage medium of claim 15, wherein at least one of the plurality of periodic updates to the aggregated reputation information received includes information provided by a network administrator.

* * * * *